US012609009B2

(12) United States Patent
Cheng

(10) Patent No.: US 12,609,009 B2

(45) Date of Patent: Apr. 21, 2026

(54) POINT OF SALES OPENABLE BY CASING OPENING DEVICE

(71) Applicant: POSIFLEX TECHNOLOGY, INC., New Taipei City (TW)

(72) Inventor: Tsung-Kan Cheng, Taipei (TW)

(73) Assignee: POSIFLEX TECHNOLOGY, INC., New Taipei City (TW)

( * ) Notice: Subject to any disclaimer, the term of this patent is extended or adjusted under 35 U.S.C. 154(b) by 228 days.

(21) Appl. No.: 18/352,261

(22) Filed: Jul. 14, 2023

(65) Prior Publication Data

US 2024/0021055 A1 Jan. 18, 2024

(30) Foreign Application Priority Data

Jul. 15, 2022 (TW) ................................ 111126752

(51) Int. Cl.
*G06Q 20/00* (2012.01)
*G07G 1/00* (2006.01)

(52) U.S. Cl.
CPC ................................ *G07G 1/0018* (2013.01)

(58) Field of Classification Search
CPC ............................ G07G 1/0018; G06Q 20/00
USPC ........................................................ 705/16
See application file for complete search history.

(56) References Cited

U.S. PATENT DOCUMENTS 7,610,658 B2 * 11/2009 Lee ....................... G06F 1/1679 16/367
7,876,551 B2 * 1/2011 Wang ........................ E05D 3/18 455/566
10,401,917 B1 * 9/2019 Dai ....................... G06F 1/1679

* cited by examiner

*Primary Examiner* — Rokib Masud
(74) *Attorney, Agent, or Firm* — CKC & Partners Co., LLC

(57) ABSTRACT

A casing opening device for point of sales is provided. The casing for point of sales has a front casing and a rear casing. The casing opening device includes two hinges which are disposed inside the front casing and the rear casing. Each hinge includes a positioning rod and a position releasing mechanism. A front end of the positioning rod points to the rear casing. A rear end of the positioning rod is disposed with a positioning hook. The position releasing mechanism includes a position releasing rod linked to the positioning rod. When the front casing is pressed down to cover the rear casing, the front casing presses the position releasing rod and moves the positioning rod to remove the positioning hook from the positioning hole, such that each of the two hinges is stored as a flatten shape as compressed by the front casing.

3 Claims, 8 Drawing Sheets

POINT OF SALES OPENABLE BY CASING OPENING DEVICE

RELATED APPLICATIONS

This application claims priority to Taiwanese Application Serial Number 111126752 filed Jul. 15, 2022, which is herein incorporated by reference.

BACKGROUND

Technical Field

The point of sales (POS) of the present disclosure is a kind of computers, which can be placed on a table and can be used as a computer for sales checkout in shops. For a known POS 10 as shown in FIG. 1, the structure of the POS has a front casing and a rear casing, and four border frames of the front casing cover around four border frames of the rear casing. The front casing is disposed with a touch panel and a liquid-crystal display. The rear casing is disposed with a computer motherboard. Please see a sectional view of the known POS in FIG. 2. The front casing 101 of the known POS 10 is disposed with a touch panel 1011 and a liquid-crystal display 1012. The rear casing 102 is disposed with a computer motherboard 1021. POS is also known as a cashier or a cash register checkout system.

Description of Related Art

With regard to the structure of the POS as mentioned above, when it is required to be maintained or repaired in a shop, the front casing has to be detached first and placed in a proper area before the operation can begin, which causes troubles. If a hinge(s) is added between the front casing and the rear casing, after the lock between the front and the rear casings is relieved, the front casing can be opened and hung on the rear casing, avoiding the problem of finding an area to place the front casing detached.

However, the action of opening the front casing is required for such structure. If two known hinges 103, respectively having only one pivotally rotary shaft core, are installed inside only one border frame at the left and right sides, as shown in FIG. 3, the border frame of the front casing at a side installed with the hinge will collide with the border frame of the rear casing at the same side during the process of opening or closing, as shown by the position pointed by the arrow A of FIG. 3, and the effect of opening cannot be achieved. Therefore, this problem of collision between the border frames during opening and closing should be solved first before any hinge is installed.

SUMMARY

A technical aspect of the present disclosure is to provide a casing opening device for point of sales, which can allow a front casing of the point of sales to be opened while the border frame of the front casing is avoided from the border frame of the rear casing at the same side, such that there is no collision between the border frames of the front casing and the rear casing when the front casing is opened or closed.

According to an embodiment of the present disclosure, a casing opening device for point of sales is provided. The point of sales has a casing. The casing has a front casing and a rear casing. Four border frames of the front casing cover around four border frames of the rear casing. The casing opening device includes two hinges. The two hinges are respectively disposed inside one of the four border frames of the front casing and inside a corresponding one of the four border frames of the rear casing at a same side. Each of the two hinges includes a rotary arm, a rotary arm spring, a base, a front casing pivoting shaft, a sliding plate, a positioning rod, a positioning rod spring and a position releasing mechanism. The rotary arm has a rotary end and a driving end opposite to the rotary end. The rotary arm spring is disposed at the rotary arm and is configured to drive the rotary arm to rotate from inwardly lying down to outwardly standing up. The base is of a strip shape and is fixed at the rear casing. A front end of the base points to the corresponding one of the four border frames of the rear casing and is pivotally connected to the rotary end of the rotary arm. A rear end of the base is opposite to the front end of the base and is disposed with a sliding path. A middle portion of the base is disposed with a positioning hole. The front casing pivoting shaft is pivotally connected to the front casing. A front end of the sliding plate points to the corresponding one of the four border frames of the rear casing and is disposed with the front casing pivoting shaft. A rear end of the sliding plate is opposite to the front end of the sliding plate and slides at the sliding path of the base. A middle portion of the sliding plate is pivotally connected to the driving end of the rotary arm. A front end of the positioning rod points to the corresponding one of the four border frames of the rear casing and is pivotally connected to the driving end of the rotary arm. The positioning rod follows the sliding plate to slide. A rear end of the positioning rod is opposite to the front end of the positioning rod and is disposed with a positioning hook. The positioning rod spring bounces the positioning hook into the positioning hole of the base after the front end of the sliding plate is lifted up and pushed outwards by the rotary arm. The position releasing mechanism includes a position releasing rod linked to the positioning rod. When the front casing is pressed down to cover the rear casing, the front casing presses the position releasing rod and then moves the positioning rod to remove the positioning hook from the positioning hole, such that each of the two hinges is stored as a flatten shape as compressed by the front casing.

In one or more embodiments of the present disclosure, the position releasing mechanism further includes a pry plate, a position releasing rod spring and a position releasing rod storage accommodating opening disposed on a corresponding one of the sliding plates. The position releasing rod is pivotally connected to the pry plate. The pry plate is pivotally connected to the positioning rod. The position releasing rod spring is installed at a pivotally connecting point of the position releasing rod and the pry plate. The position releasing rod spring is configured to pry up the positioning hook, such that the position releasing rod is stored in the position releasing rod storage accommodating opening.

In one or more embodiments of the present disclosure, the position releasing mechanism further includes a position releasing rod storage accommodating opening disposed on a corresponding one of the sliding plates. The position releasing rod is disposed with a bending point configured to pry up the positioning hook, such that the position releasing rod is stored in the position releasing rod storage accommodating opening formed from a remaining space of the front casing and the rear casing.

In one or more embodiments of the present disclosure, the base is of a “U” shape.

In one or more embodiments of the present disclosure, the sliding plate is of a strip of “n” shape.

In one or more embodiments of the present disclosure, the rotary arm is of a strip of "n" shape.

In one or more embodiments of the present disclosure, each of the two hinges includes a rotary shaft core. The rotary shaft core is disposed at the base and pivotally connected to the rotary arm.

In one or more embodiments of the present disclosure, each of the two hinges includes a sliding shaft core. The sliding shaft core is disposed at the sliding plate and configured to slide along the sliding path.

In one or more embodiments of the present disclosure, each of the two hinges includes a driving shaft core. The driving shaft core is disposed at the rotary arm and pivotally connected to the sliding plate.

According to an embodiment of the present disclosure, a casing opening device for point of sales is provided. The point of sales has a casing. The casing has a front casing and a rear casing. Four border frames of the front casing cover around four border frames of the rear casing. The casing opening device includes two hinges. The two hinges are separated from each other and disposed inside one of the four border frames of the front casing and inside a corresponding one of the four border frames of the rear casing at a same side. Each of the two hinges includes a sectionally n-shaped rotary arm, a rotary arm spring, a sectionally U-shaped base, a front casing pivoting shaft, a sectionally n-shaped sliding plate, a positioning rod, a positioning rod spring and a position releasing mechanism. The sectionally n-shaped rotary arm has a rotary end and a driving end opposite to the rotary end. The rotary arm spring is disposed at the sectionally n-shaped rotary arm and is configured to drive the sectionally n-shaped rotary arm to rotate from inwardly lying down to outwardly standing up. The sectionally U-shaped base is fixed at the rear casing. A front end of the sectionally U-shaped base points to the corresponding one of the four border frames of the rear casing and is pivotally connected to the rotary end of the sectionally n-shaped rotary arm. A rear end of the sectionally U-shaped base is opposite to the front end of the sectionally U-shaped base and is disposed with a sliding path. A middle portion of the sectionally U-shaped base is disposed with a positioning hole. The front casing pivoting shaft is pivotally connected to the front casing. A front end of the sectionally n-shaped sliding plate points to the corresponding one of the four border frames of the rear casing and is disposed with the front casing pivoting shaft. A rear end of the sectionally n-shaped sliding plate is opposite to the front end of the sectionally n-shaped sliding plate and slides at the sliding path of the sectionally U-shaped base. A middle portion of the sectionally n-shaped sliding plate is pivotally connected to the driving end of the sectionally n-shaped rotary arm. A front end of the positioning rod points to the corresponding one of the four border frames of the rear casing and is pivotally connected to the driving end of the sectionally n-shaped rotary arm. The positioning rod follows the sectionally n-shaped sliding plate to slide. A rear end of the positioning rod is opposite to the front end of the positioning rod and is disposed with a positioning hook. The positioning rod spring bounces the positioning hook into the positioning hole of the sectionally U-shaped base after the front end of the sectionally n-shaped sliding plate is lifted up and pushed outwards by the sectionally n-shaped rotary arm. The position releasing mechanism includes a position releasing rod linked to the positioning rod. When the front casing is pressed down to cover the rear casing, the front casing presses the position releasing rod and then moves the positioning rod to remove the positioning hook from the positioning hole, such that each of the two hinges is stored as a flatten shape as compressed by the front casing.

In one or more embodiments of the present disclosure, the position releasing mechanism further includes a pry plate, a position releasing rod spring and a position releasing rod storage accommodating opening disposed on a corresponding one of the sectionally n-shaped sliding plates. The position releasing rod is pivotally connected to the pry plate. The pry plate is pivotally connected to the positioning rod. The position releasing rod spring is installed at a pivotally connecting point of the position releasing rod and the pry plate. The position releasing rod spring is configured to pry up the positioning hook, such that the position releasing rod is stored in the position releasing rod storage accommodating opening.

In one or more embodiments of the present disclosure, the position releasing mechanism further includes a position releasing rod storage accommodating opening disposed on a corresponding one of the sectionally n-shaped sliding plates. The position releasing rod is disposed with a bending point configured to pry up the positioning hook, such that the position releasing rod is stored in the position releasing rod storage accommodating opening formed from a remaining space of the front casing and the rear casing.

In one or more embodiments of the present disclosure, each of the two hinges includes a rotary shaft core. The rotary shaft core is disposed at the sectionally U-shaped base and pivotally connected to the sectionally n-shaped rotary arm.

In one or more embodiments of the present disclosure, each of the two hinges includes a sliding shaft core. The sliding shaft core is disposed at the sectionally n-shaped sliding plate and configured to slide along the sliding path.

In one or more embodiments of the present disclosure, each of the two hinges includes a driving shaft core. The driving shaft core is disposed at the sectionally n-shaped rotary arm and pivotally connected to the sectionally n-shaped sliding plate.

The above-mentioned embodiments of the present disclosure have at least the following advantages: the casing opening device for point of sales solves the problem of collision between the border frames of the front casing and the rear casing when the front casing is opened or closed.

The term of "lifting up" means the front casing and the rear casing leave from each other in a nearly perpendicular direction.

The term of "pushing outwards" means the border frame of the front casing installed with the hinges leaves and moves out towards the border frame of the rear casing in a nearly horizontal direction.

The term of "pushing to move inwards" means pushing the front casing from the outside to a position nearly perpendicular to the rear casing.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
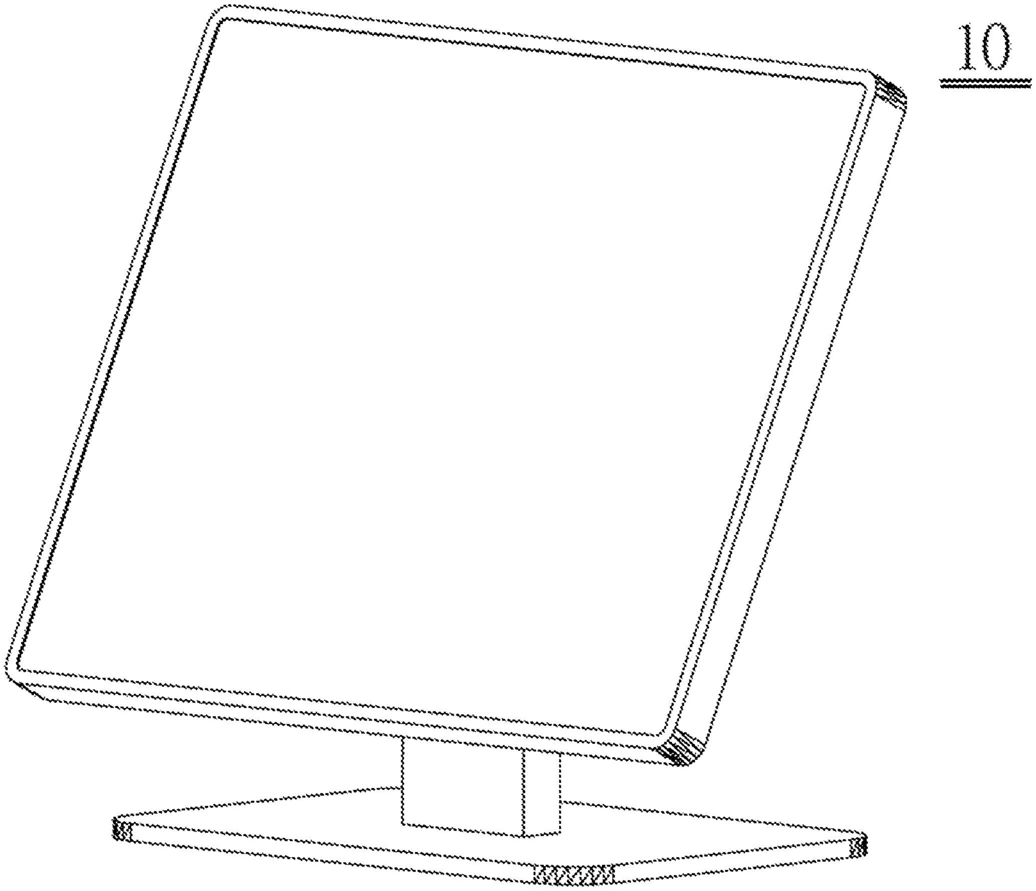
Fig. 1 (PRIOR ART)
FIG. 1 is an appearance diagram of a known point of sales in prior art.
Figure 2:
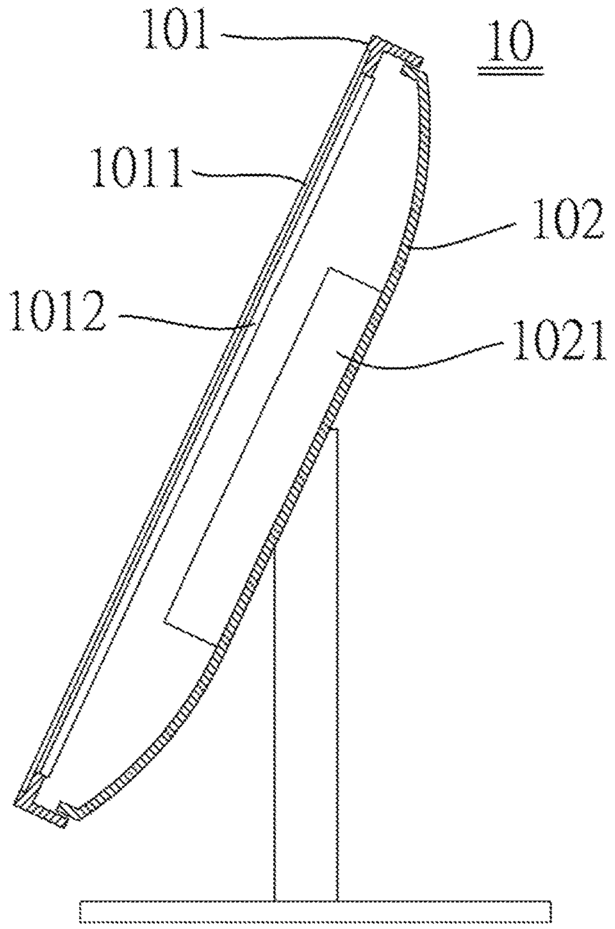
Fig. 2 (PRIOR ART)
FIG. 2 is a sectional view of the known point of sales in prior art of FIG. 1.
Figure 3:
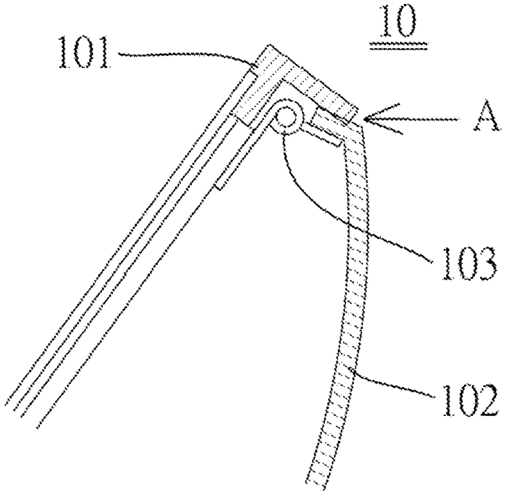
Fig. 3 (PRIOR ART)
FIG. 3 is a schematic view of the known point of sales in prior art of FIG. 1, in which two of the border frames collide with each other.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 4:
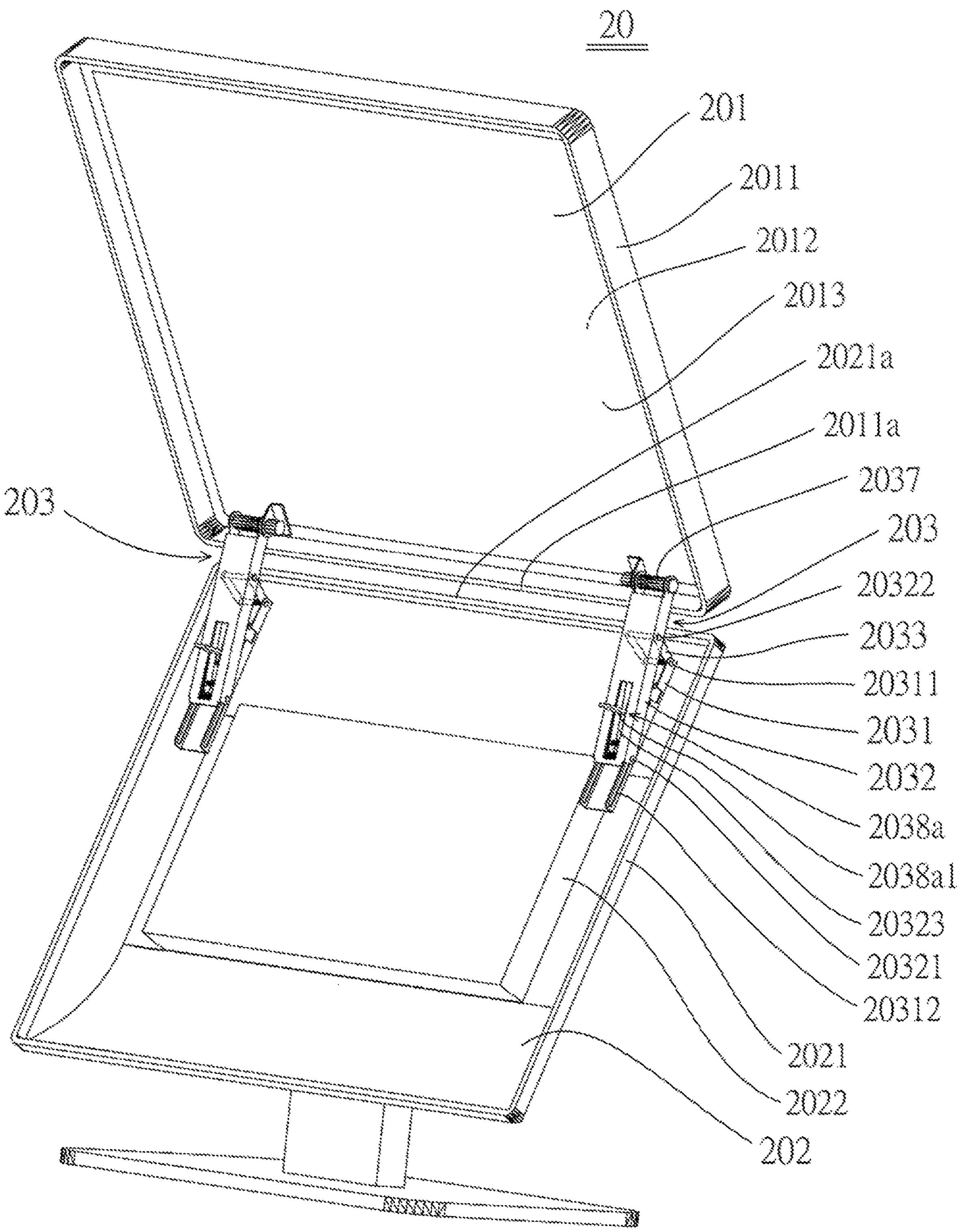
FIG. 4 is a schematic view of a casing opening device for point of sales according to an embodiment of the present disclosure.

Reference is made to FIG. 4. FIG. 4 is a schematic view (embodiment one of the present disclosure) of a casing opening device for point of sales according to an embodiment of the present disclosure. A casing opening device 20 for point of sales is provided. The point of sales has a casing. The casing has a front casing 201 and a rear casing 202. Four border frames 2011 of the front casing 201 cover around four border frames 2021 of the rear casing 202. The front casing 201 includes a touch panel 2012 and a liquid-crystal display 2013. The rear casing 202 includes a computer motherboard 2022.

The casing opening device 20 includes two hinges 203. The two hinges 203 are respectively disposed inside the border frame 2011*a* of the front casing 201 and inside the border frame 2021*a* of the rear casing 202 at the same side. Moreover, one of the two hinges 203 is located at the left and another one of the two hinges 203 is located at the right, as shown in FIG. 4.

Figure 7:
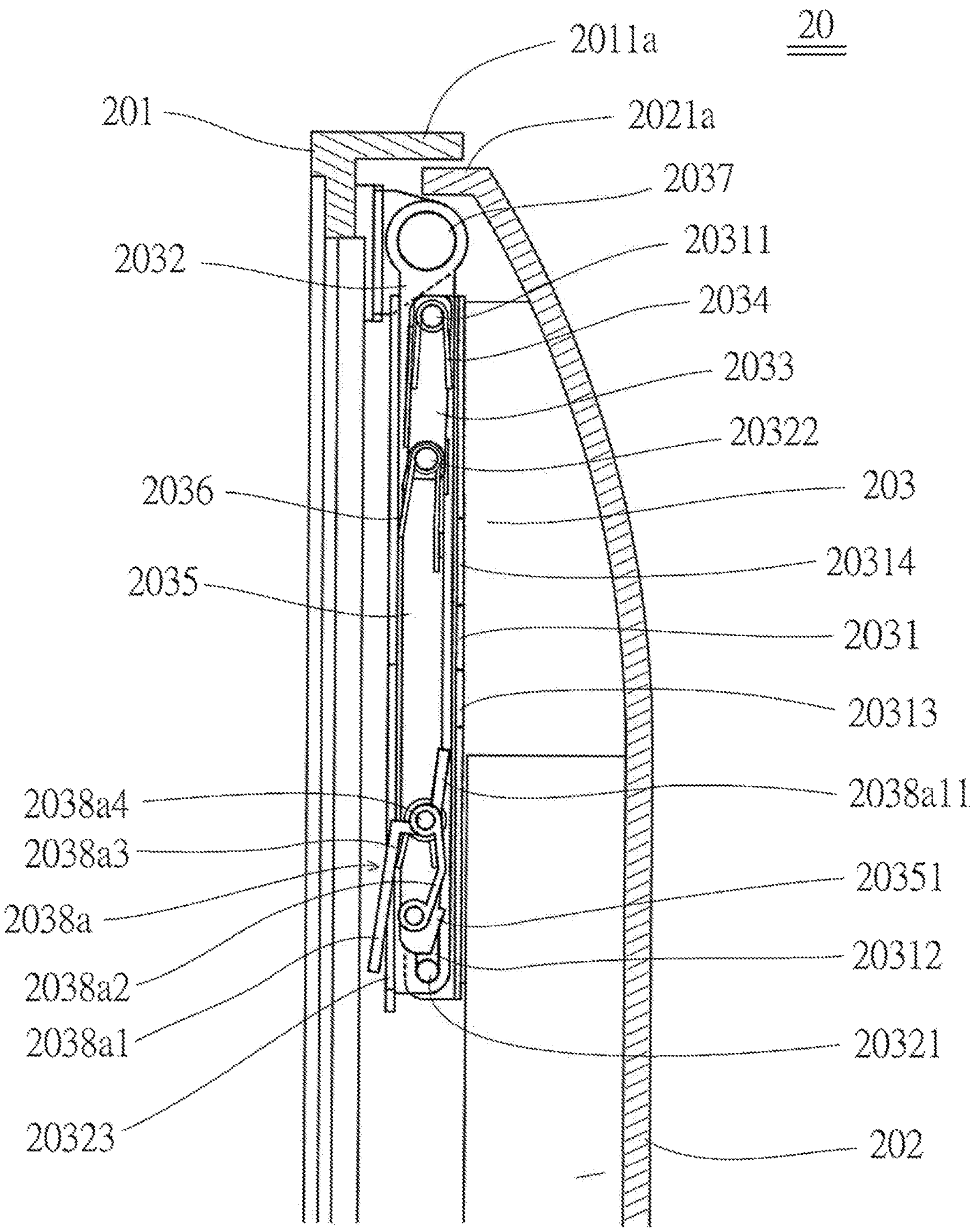
FIG. 7 of a schematic view after closing of the front casing of FIG. 6 is completed.
Figure 8:
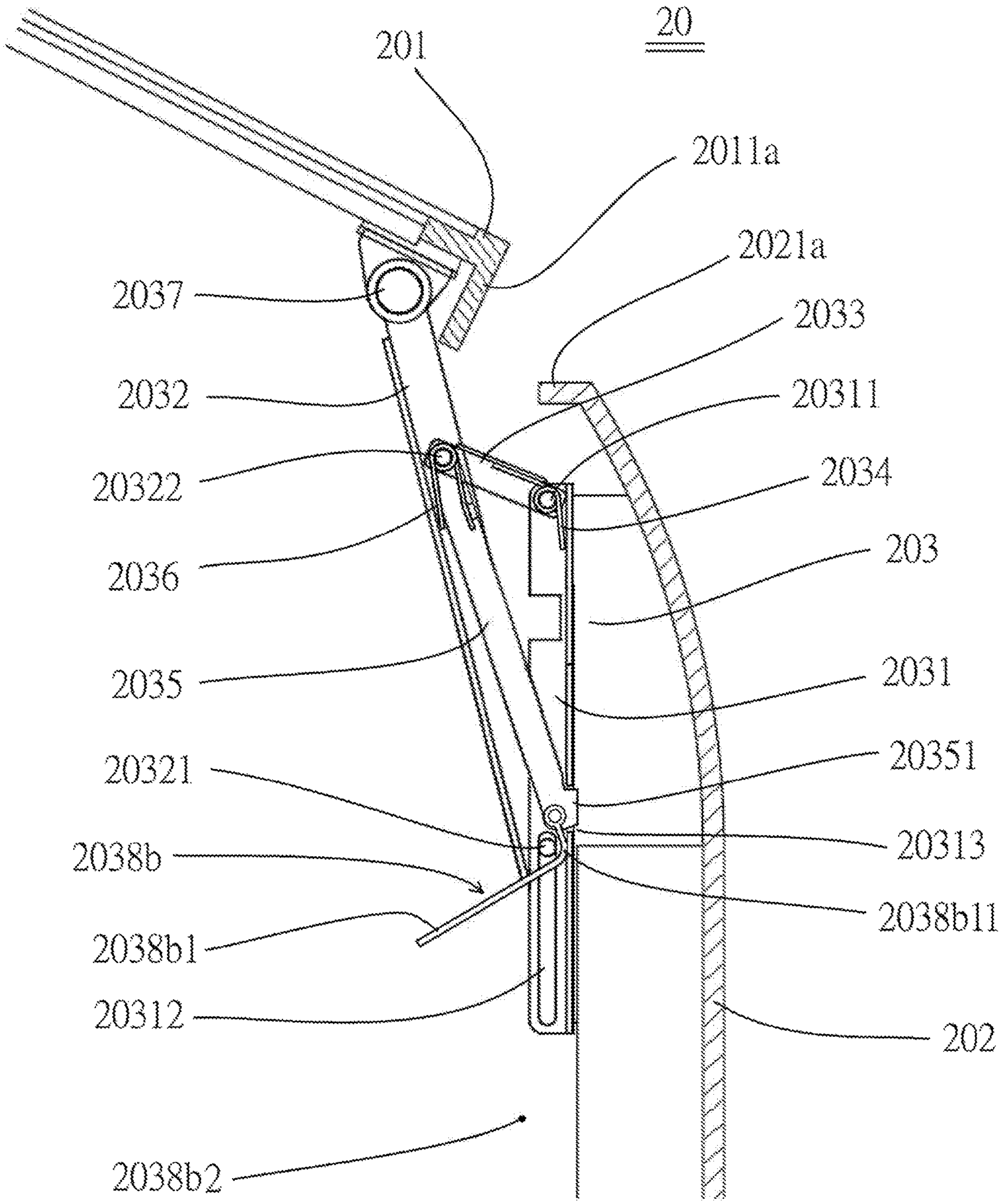
FIG. 8 is a schematic view of a positioning status of one of the two hinges of a casing opening device for point of sales according to another embodiment of the present disclosure.
Figure 9:
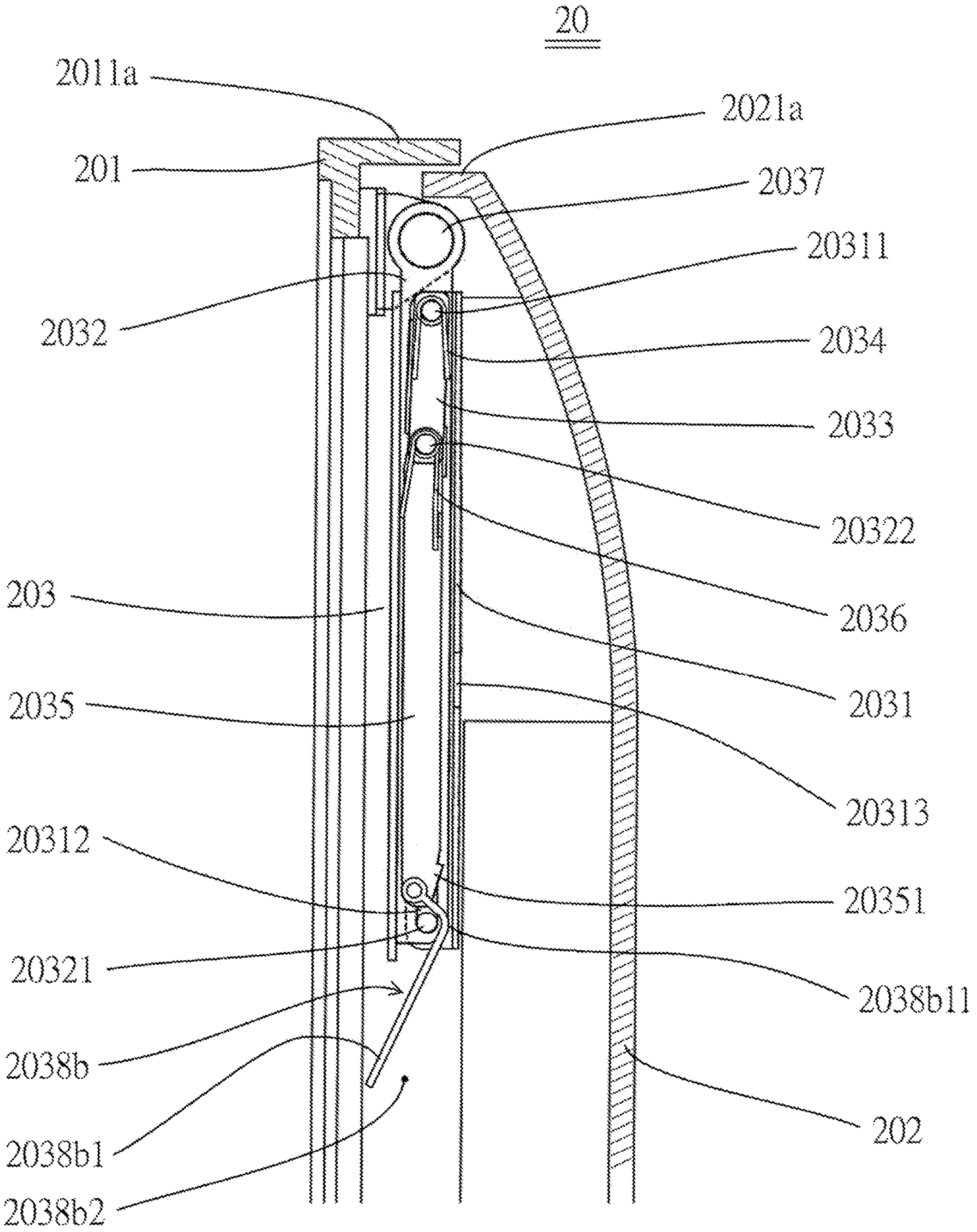
FIG. 9 of a schematic view after closing of the front casing of FIG. 8 is completed.

Each of the two hinges 203 includes a rotary arm 2033, a rotary arm spring 2034 (please see FIG. 5), a base 2031, a front casing pivoting shaft 2037, a sliding plate 2032, a positioning rod 2035 (please see FIG. 5), a positioning rod spring 2036 (please see FIG. 5), and a position releasing mechanism 2038*a* (a position releasing mechanism 2038*a* in embodiment one as shown in FIGS. 4, 5, 6, 7; a position releasing mechanism 2038*b* in embodiment two as shown in FIGS. 8, 9).

Figure 5:
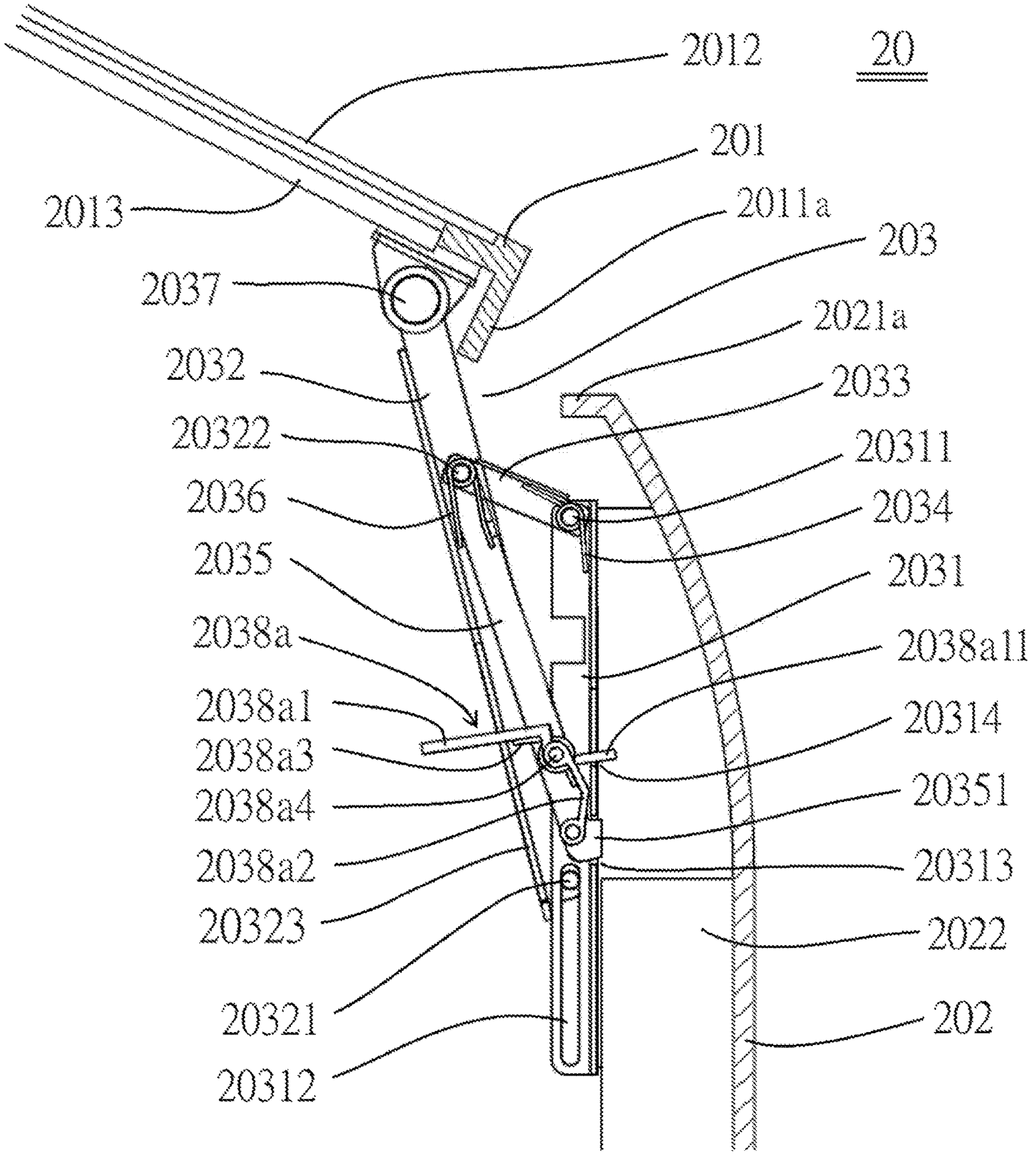
FIG. 5 is a sectional side view of one of the two hinges of the casing opening device of FIG. 4.
Figure 6:
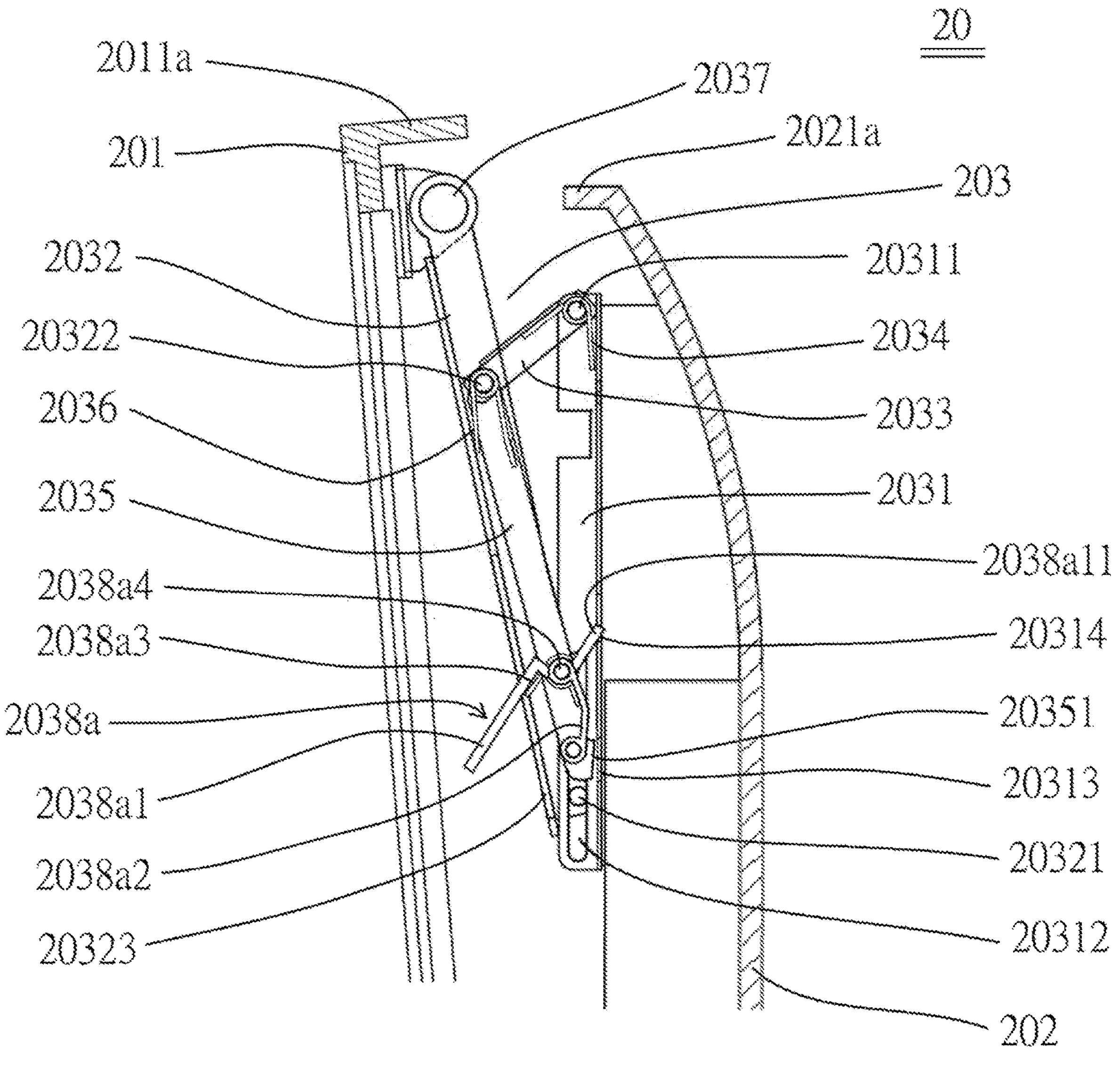
FIG. 6 is a schematic view of storage process of one of the two hinges of a casing opening device for point of sales according to an embodiment of the present disclosure.

Reference is made to FIG. 5. FIG. 5 is a sectional side view (embodiment one of the present disclosure) of one of the two hinges 203 of the casing opening device of FIG. 4. As shown in FIGS. 4-5, the base 2031 is made to be a strip of "U" shape and is fixed at the rear casing 202. A front end of the base 2031 points to the border frame 2021*a*. Another end of the base 2031 is a rear end. As shown in FIG. 4, the front end of the base 2031 is disposed with a rotary shaft core 20311 fixed at two sides of the U-shaped front end of the base 2031, to pivotally connect to a rotary end (i.e., an end of the rotary shaft core 20311) of the rotary arm 2033. Two sides of the U-shaped rear end of the base 2031 are respectively disposed with a sliding path 20312, which allows a rear end of the sliding plate 2032 to slide. A middle portion of the base 2031 is disposed with a positioning hole 20313 (please see FIG. 5). A front end of the positioning rod 2035 (please see FIG. 5) points to the border frame 2021*a* of the rear casing 202 and is pivotally connected to a driving end of the rotary arm 2033. The positioning rod 2035 follows the sliding plate 2032 to slide. A rear end of the positioning rod 2035 is opposite to the front end of the positioning rod 2035 and is disposed with a positioning hook 20351 (please see FIG. 5). The positioning hole 20313 is provided to be engaged by the positioning hook 20351 for positioning under the status when the front end of the sliding plate 2032 of the hinge 203 is lifted up and pushed outwards by the rotary arm 2033.

The sliding plate 2032 is made to a strip of "n" shape. A front end of the sliding plate 2032 points to the border frame 2021*a* of the rear casing 202. Another end of the sliding plate 2032 is a rear end. As shown in FIG. 4, the rear end of the sliding plate 2032 is disposed with a sliding shaft core 20321. The sliding plate 2032 can slide along the sliding path 20312 of the base 2031. A middle portion of the sliding plate 2032 is pivotally connected to the driving end (i.e., an end of a driving shaft core 20322) of the rotary arm 2033, and the sliding plate 2032 can be moved by the rotary arm 2033. The front end of the sliding plate 2032 is disposed with a front casing pivoting shaft 2037 pivotally connected to the front casing 201, such that the front casing 201 can be rotated to open and close.

The rotary arm 2033 is made to a strip of "n" shape. The rotary arm 2033 has a rotary end and a driving end opposite to the rotary end. The rotary end (i.e., an end of the rotary shaft core 20311) is pivotally connected to the front end of the base 2031. The driving end (i.e., an end of the driving shaft core 20322) is pivotally connected to the middle portion of the sliding plate 2032. As shown in FIG. 4, the rotary end (i.e., an end of the rotary shaft core 20311) is pivotally connected to the base 2031 through the rotary shaft core 20311, such that the rotary arm 2033 can rotate to inwardly lay down or outwardly stand up. The driving end (i.e., an end of the driving shaft core 20322) is disposed with a driving shaft core 20322 pivotally connected to the middle portion of the sliding plate 2032. The driving end is further disposed with a rotary arm spring 2034 (please see FIG. 5), such that the rotary arm 2033 has the force to rotate from inwardly lying down to outwardly standing up, in order to drive the front end of the sliding plate 2032 to be lifted up and pushed outwards, such that the border frame 2011*a* of the front casing 201 is then lifted up and pushed outwards. In this way, in the process when the front casing 201 is opened or closed, the border frame 2011*a* of the front casing 201 is separated from the range of interference with the border frame 2021*a* of the rear casing 202, such that the collision between the two border frames 2011*a*, 2021*a* can be avoided.

Through the combination of the inside and outside arrangements of the base 2031, the sliding plate 2032 and the rotary arm 2033 in U-shape and n-shape, the two hinges 203 can be easily stored as flatten shapes after the front casing 201 is closed, as shown in FIG. 7.

The front end of the positioning rod 2035 (please see FIG. 5) points to the border frame 2021*a* of the rear casing 202. Another end of the positioning rod 2035 is the rear end. The front end of the positioning rod 2035 is pivotally connected to the driving shaft core 20322, while the rear end of the positioning rod 2035 formed to be the positioning hook 20351 (please see FIG. 5). As shown in FIG. 5, after the rotary arm 2033 rotates outwardly to stand up, the positioning rod 2035 is driven to move outwards, and the positioning hook 20351 is bounced to the positioning hole 20313 of the base 2031 by the positioning rod spring 2036. The hinge 203 positioned at the front end of the sliding plate 2032 is at the position after being lifted up and pushed outwards, in order to maintain the two border frames 2011*a*, 2021*a* from not colliding with each other when the front casing 201 is opened or closed, as shown in the position in FIG. 5.

The position releasing mechanism includes a position releasing rod, and there are two types, namely embodiment one and embodiment two. The position releasing rod 2038*a*1 of the position releasing mechanism 2038*a* in embodiment one is shown in FIGS. 4, 5, 6, 7. The position releasing rod 2038*b*1 of the position releasing mechanism 2038*b* in embodiment two is shown in FIGS. 8, 9. The position releasing rod 2038*a*1 or the position releasing rod 2038*b*1 is linked to the positioning rod 2035. When the hinge 203 is in a positioning status with the front end of the sliding plate 2032 being lifted up and pushed outwards, the position releasing rod 2038*a*1 or 2038*b*1 are both in a status protruding towards the front casing 201, as shown in FIGS. 4, 5, 8, such that during the action of compression when the front casing 201 is closed, the position releasing rod 2038*a*1 or 2038*b*1 can be pressed, and then the positioning rod 2035 is moved to remove the positioning hook 20351 from the position hole 20313 to relieve the positioning status of the two hinges 203. In this way, the front casing 201 can push inwards and press down the sliding plate 2032, the rotary arm 2033 and the positioning rod 2035, and the two hinges 203 can be stored as flatten shapes while the front casing 201 can be closed to the closing position, as the embodiment one shown in FIG. 7 and the embodiment two shown in FIG. 9.

Reference is made to FIG. 5. With regard to the way of linkage of the position releasing rod 2038*a*1 in embodiment one, the position releasing rod 2038*a*1 is pivotally connected to a pry plate 2038*a*2. The pry plate 2038*a*2 is further pivotally connected to the positioning rod 2035. The pry plate 2038*a*2 is protruded at its middle portion and abuts against the base 2031, as shown in FIG. 5. When the position releasing rod 2038*a*1 is pressed down by the front casing 201, the positioning hook 20351 can be pried up by the pry plate 2038*a*2 to relieve the positioning of the two hinges 203.

Reference is made to FIG. 8. FIG. 8 is a schematic view of a positioning status of one of the two hinges 203 of a casing opening device 20 for point of sales according to another embodiment (embodiment two) of the present disclosure. With regard to the way of linkage of the position releasing rod 2038*b*1 in embodiment two, the position releasing rod 2038*b*1 is disposed with a bending point 2038*b*11 at its middle portion. The bending point 2038*b*11 abuts against the base 2031. The rear end is pivotally connected to the positioning rod 2035, as shown in FIG. 8. When the position releasing rod 2038*b*1 is pressed down by the front casing 201, the positioning hook 20351 can be directly pried up to relieve the positioning of the two hinges 203.

Reference is made to FIG. 5. With regard to the position releasing mechanism 2038*a* in embodiment one, there is storage action and storage accommodating space of the position releasing rod 2038*a*1 on the hinge 203, such that the position releasing rod 2038*a*1 protruding towards the front casing 201 has room to lay down, in order not to interfere the storage of the hinge 203 into the flattened shape. A rear end 2038*a*11 is disposed at the position releasing rod 2038*a*1 to extend from a limiting opening 20314 disposed on the base 2031. A position releasing rod spring 2038*a*3 is installed at a pivotally connecting point 2038*a*4 of the position releasing rod 2038*a*1 and the pry plate 2038*a*2. Accordingly, under the positioning status of the hinge 203, the rear end 2038*a*11 of the position releasing rod 2038*a*1 can lean against an inner edge of the limiting opening 20314 to stand up and protrude to extend towards the front casing 201 at the sliding plate 2032, such that the front casing 201 can press down the position releasing rod 2038*a*1 and pry up the positioning hook 20351.

Although the limiting opening 20314 and the positioning hole 20313 are both disposed at the U-shaped bottom of the base 2031, through the utilization of the width of the bottom, the limiting opening 20314 can be disposed at the central zone (not shown) of the bottom, while the positioning hole 20313 can be disposed at the bottom near its outer edge. The positions of sliding in front of and at the back of the bottom of the base 2031 of the two can be staggered during movements and interference is avoided.

Moreover, a position releasing rod storage accommodating opening 20323 (please see FIGS. 4-5) is disposed on the sliding plate 2032 as a storage accommodating space for the position releasing rod 2038*a*1. When the position releasing rod 2038*a*1 is pressed down by the front casing 201 and its positioning is relieved, the positioning rod 2035 will be pushed to move inwards along with the sliding plate 2032, and the pry plate 2038*a*2 and the position releasing rod 2038*a*1 pivotally connected to the positioning rod 2035 are also pulled to move inwards. Since the limiting opening 20314 blocks the rear end 2038*a*11 of the position releasing rod 2038*a*1, the position releasing rod 2038*a*1 is pushed to lay down. As shown in the storage process of one of the two hinges 203 in FIG. 6, the position releasing rod 2038*a*1 can be stored in the position releasing rod storage accommodating opening 20323, such that the front casing 201 and the rear casing 202 can be closed, while not interfering the storage of the hinge 203 into the flattened shape, as the closing of the front casing 201 in embodiment one shown in FIG. 7.

The position releasing rod storage accommodating opening 2038*b*2 with the position releasing rod 2038*b*1 being pressed down in embodiment two can be formed from a remaining space of the front casing 201 and the rear casing 202, while not interfering the storage of the hinge 203 into the flattened shape, as the closing of the front casing 201 in embodiment two shown in FIG. 9.

The two hinges 203 are completed below. The bases 2031 of the two hinges 203 are fixed inside the border frame 2021*a* of the rear casing 202 with one at the left and one at the right, and the front casing pivoting shafts 2037 are pivotally connected to the border frame 2011*a* of the front casing 201 at the same side. At this point, the casing opening device 20 for point of sales in the disclosure is completed. The casing opening device 20 for point of sales in the disclosure solves the problem of mutual collision between the border frames of the front casing 201 and the rear casing 202, provided that the front casing 201 has a structure for opening. Thus, the front casing 201 can be opened or closed without collision with the rear casing 202.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A point of sales openable by a casing opening device, the point of sales having a casing, the casing having a front casing and a rear casing, four border frames of the front casing covering around four border frames of the rear casing, the casing opening device comprising:

two hinges respectively disposed inside one of the four border frames of the front casing and inside a corresponding one of the four border frames of the rear casing at a same side, each of the two hinges comprising:

a rotary arm having a rotary end and a driving end opposite to the rotary end;

a rotary arm spring disposed at the rotary arm and configured to drive the rotary arm to rotate from inwardly lying down to outwardly standing up;

a base being of a strip shape and fixed at the rear casing, a front end of the base pointing to the corresponding one of the four border frames of the rear casing and pivotally connecting to the rotary end of the rotary arm, a rear end of the base being opposite to the front end of the base and being disposed with a sliding path, a middle portion of the base being disposed with a positioning hole;

a front casing pivoting shaft pivotally connected to the front casing;

a sliding plate, a front end of the sliding plate pointing to the corresponding one of the four border frames of the rear casing and being disposed with the front casing pivoting shaft, a rear end of the sliding plate being opposite to the front end of the sliding plate and sliding at the sliding path of the base, a middle portion of the sliding plate being pivotally connected to the driving end of the rotary arm; and a positioning rod, a front end of the positioning rod pointing to the corresponding one of the four border frames of the rear casing and being pivotally connected to the driving end of the rotary arm, the positioning rod following the sliding plate to slide, a rear end of the positioning rod being opposite to the front end of the positioning rod and being disposed with a positioning hook.

2. The point of sales openable by the casing opening device of claim 1, wherein the position releasing mechanism further comprises a pry plate, a position releasing rod spring and a position releasing rod storage accommodating opening disposed on a corresponding one of the sliding plates, the position releasing rod is pivotally connected to the pry plate, the pry plate is pivotally connected to the positioning rod, the position releasing rod spring is installed at a pivotally connecting point of the position releasing rod and the pry plate, the position releasing rod spring is configured to pry up the positioning hook, such that the position releasing rod is stored in the position releasing rod storage accommodating opening.

3. The point of sales openable by the casing opening device of claim 1, wherein the position releasing mechanism further comprises a position releasing rod storage accommodating opening disposed on a corresponding one of the sliding plates, the position releasing rod is disposed with a bending point configured to pry up the positioning hook, such that the position releasing rod is stored in the position releasing rod storage accommodating opening formed from a remaining space of the front casing and the rear casing.

* * * * *